(12) United States Patent
Fischer

(10) Patent No.: US 9,741,245 B1
(45) Date of Patent: Aug. 22, 2017

(54) METHOD AND APPARATUS FOR PRODUCING OPTICAL TRACKING AND NUTATION AT HIGH FREQUENCIES WITH LOW POWER

(71) Applicant: NORTHROP GRUMMAN SYSTEMS CORPORATION, Falls Church, VA (US)

(72) Inventor: Gerald R. Fischer, Luray, VA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 0 days.

(21) Appl. No.: 15/492,359

(22) Filed: Apr. 20, 2017

(51) Int. Cl.
*H02N 2/00* (2006.01)
*G08C 23/04* (2006.01)
*H01L 41/04* (2006.01)
*H01L 41/09* (2006.01)

(52) U.S. Cl.
CPC ............ *G08C 23/04* (2013.01); *H01L 41/042* (2013.01); *H01L 41/09* (2013.01); *H02N 2/0075* (2013.01)

(58) Field of Classification Search
CPC .......... H02N 2/008; H02N 2/065; H02N 2/14; H02N 2/142; H02N 2/145; H01L 41/042
USPC .................................................. 310/314, 317
See application file for complete search history.

(56) References Cited

U.S. PATENT DOCUMENTS

| | | | |
|---|---|---|---|
| 628,195 A | 7/1899 | Clayton, Jr. | |
| 4,173,762 A | 11/1979 | Thompson et al. | |
| 4,227,077 A | 10/1980 | Hopson et al. | |
| 4,743,114 A | 5/1988 | Crane, Jr. | |
| 6,909,850 B2 | 6/2005 | Fischer | |
| 2013/0233159 A1* | 9/2013 | Kuroki | G10H 1/12 84/736 |

OTHER PUBLICATIONS

Stay, Justin L. et al. "Dependence on Fiber Fabry-Pe'rot Tunable Filter Characteristics in an All-Fiber Swept—Wavelength Laser for Use in an Optical Coherence Tomography System" Micron Optics, Inc., 12 pgs.

* cited by examiner

*Primary Examiner* — Derek Rosenau
(74) *Attorney, Agent, or Firm* — John A. Miller; Miller IP Group, PLC

(57) ABSTRACT

A reduced power consumption actuator drive circuit that includes separate circuit power paths for different portions of the signal spectrum for applications in which lower frequencies have high amplitudes. The low frequency circuit paths use higher power supply voltages at lower currents and the high frequency circuit paths use lower power supply voltages at higher currents. In one embodiment, the drive circuit drives a nutator that employs a resonating circuit that maintains actuator motion with reduced energy supplied by the power supply.

27 Claims, 4 Drawing Sheets

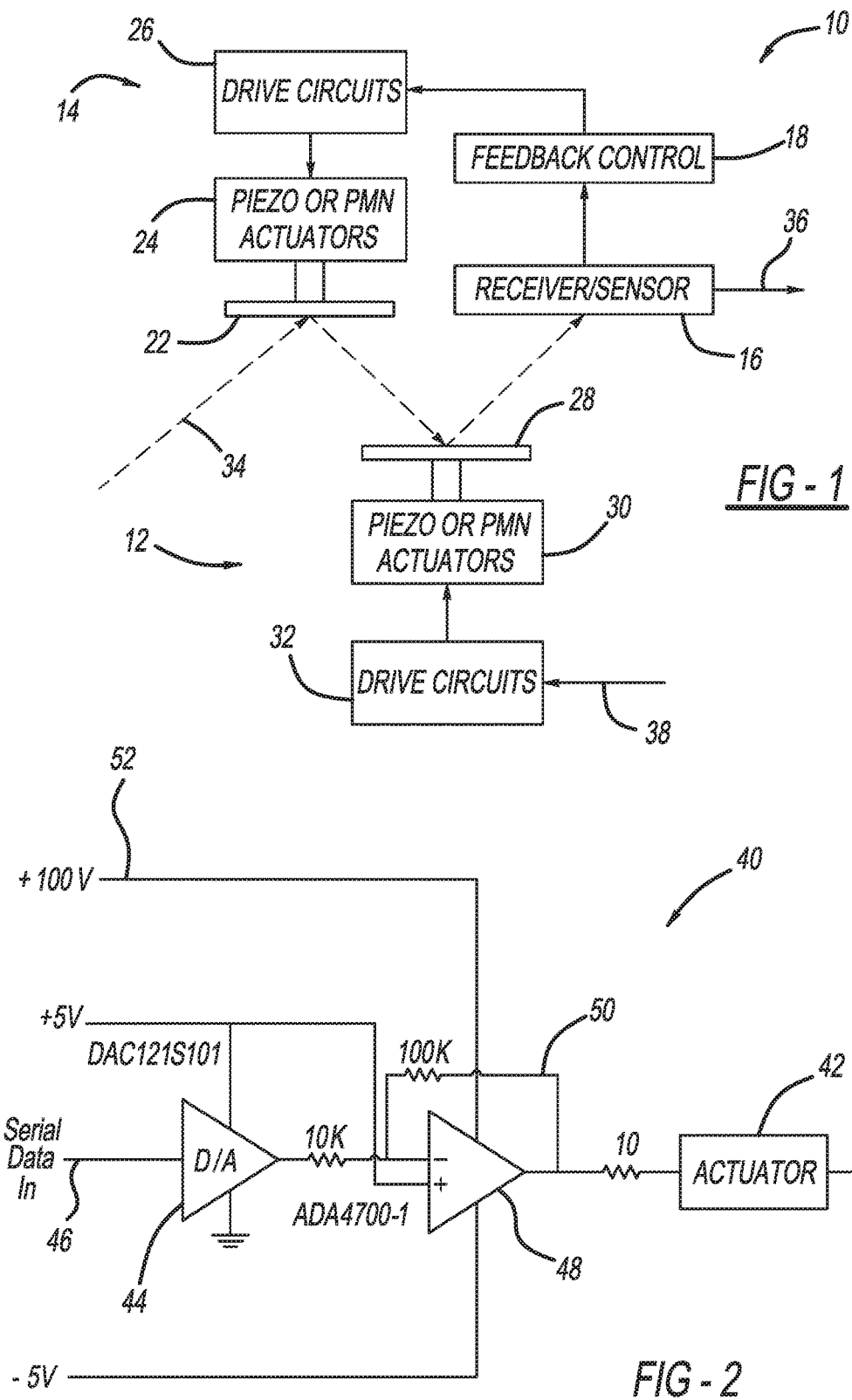

METHOD AND APPARATUS FOR PRODUCING OPTICAL TRACKING AND NUTATION AT HIGH FREQUENCIES WITH LOW POWER

BACKGROUND

Field

This invention relates generally to a system for tracking a beam of light and, more particularly, a system for tracking a beam of light that includes one or more mirrors controlled by drivers and actuators, where one mirror may be a high speed tracking mirror and another mirror may be a nutator mirror, and where each mirror is driven by a high voltage position drive circuit that provides a low current, low frequency, or near DC, position drive signal to an actuator and a low voltage drive circuit that provides a high current, high frequency drive signal to the actuator.

Discussion

Communications systems are known in the art that transmit data and other information from a transmitter to a receiver on a modulated beam of light. A sensor in the receiver receives the light beam and converts it to an electrical signal for processing. In order to receive the beam in an effective manner to collect the data therefrom, and at greater distances, it is necessary to orient the optics of the sensor toward the transmitter. Because for some of these types of communications systems there is relative movement between the transmitter and the receiver, it is often necessary for the receiver to actively track the beam. Although the best reception of the beam would occur if the light beam is pointed directly at the sensor, it is difficult to track the beam with that level of accuracy.

One technique for tracking a beam of light is to employ a sensor that has the capability to determine the degree and direction of misalignment of the beam and a feedback control system that uses the misalignment estimate to operate a tracking mechanism that alters the beam direction. The bandwidth of the control system used for this purpose must be sufficient to track the relative motion of the beam and to suppress high frequency vibrational disturbances on the optical system, and further, the tracking mechanism and its associated drive circuit must have a bandwidth on the order of 10 times greater than the control system bandwidth to avoid instability. However, for the various actuators that are employed in the art for this purpose, such as piezoelectric actuators, providing a high enough rate of the tracking mechanism requires a significant amount of power, which is an obvious drawback. For example, vibrational disturbances on these types of optical systems are typically as high as 1000 Hz, which requires bandwidth of the mechanism to be at least 10 times greater in frequency. Thus, the electronic drive circuits required to drive the tracking mechanism are often difficult to implement.

One technique for obtaining the sensor estimate of misalignment is to employ a nutator that oscillates a mirror, or other optical element, so that the beam being tracked lands offset from a center location on the sensor optics. Specifically, the mirror is rotated so that the received beam oscillates around the center location and the magnitude of the beam is observed so that if it is constant, it is known that the sensor optics is aligned with the beam. If the sensor optics is misaligned to the beam being tracked, the amplitude of the received beam will vary as the mirror is being oscillated, which provides an indication of the direction and magnitude of misalignment of the beam. In other words, the nutator causes the beam of light to be rotated in a small circle at a high speed, which is used for providing an error metric for tracking the light beam similar to a conical scan approach employed for RF antennas. By employing a nutator that imparts a slight angle of the beam directed toward the sensor optics, the modest amount of received power that is given up as a result of the nutation is compensated by the benefit of the ability to track the beam.

Actuators are employed in these types of nutators to rotate the angle of a mirror or other mechanism, which requires sophisticated control and a desired speed of rotation. Further, the speed of rotation determines the speed with which measurements of misalignment of the incoming beam can be produced. Thus, it is necessary to have a high enough rate of oscillation of the beam to produce sufficiently high speed estimates of the error that will then support a large enough control system bandwidth to suppress high frequency vibrational disturbances on the optical system. As in the case of the tracking mechanism, for the various actuators that are employed in the art for this purpose, such as piezoelectric actuators, providing a high enough oscillation rate of the mechanism requires a significant amount of power, which is an obvious drawback. For example, vibrational disturbances on these types of optical systems are typically as high as 1000 Hz, which requires nutation of the mechanism, and production of misalignment estimates, to be at least 10 times greater in frequency. Thus, the electronic drive circuits required to drive the nutator are also often difficult to implement.

Beam direction alteration for tracking and nutation to accomplish pointing the sensor optics at the optical beam being received is typically accomplished by electro-optical or electro-mechanical devices. However, electro-optical devices may have difficult constraints such as a need for polarized light and a very high drive voltage, and electro-mechanical devices consume increasing amounts of power as the frequency of operation increases, which is particularly true of devices using either piezoelectric or electrostrictive elements that are capacitive in nature. Thus, a reduction of power consumption is desired to make high frequency electro-mechanical tracking and nutation practical.

BRIEF DESCRIPTION OF THE DRAWINGS

FIG. 1 is a schematic block diagram of a receiver system including a nutator device for oscillating a nutation mirror and a tracking device for pointing a tracking mirror;

FIG. 2 is a schematic diagram of a known drive circuit that can be employed in the receiver system shown in FIG. 1;

DETAILED DESCRIPTION OF THE EMBODIMENTS

Figure 3:
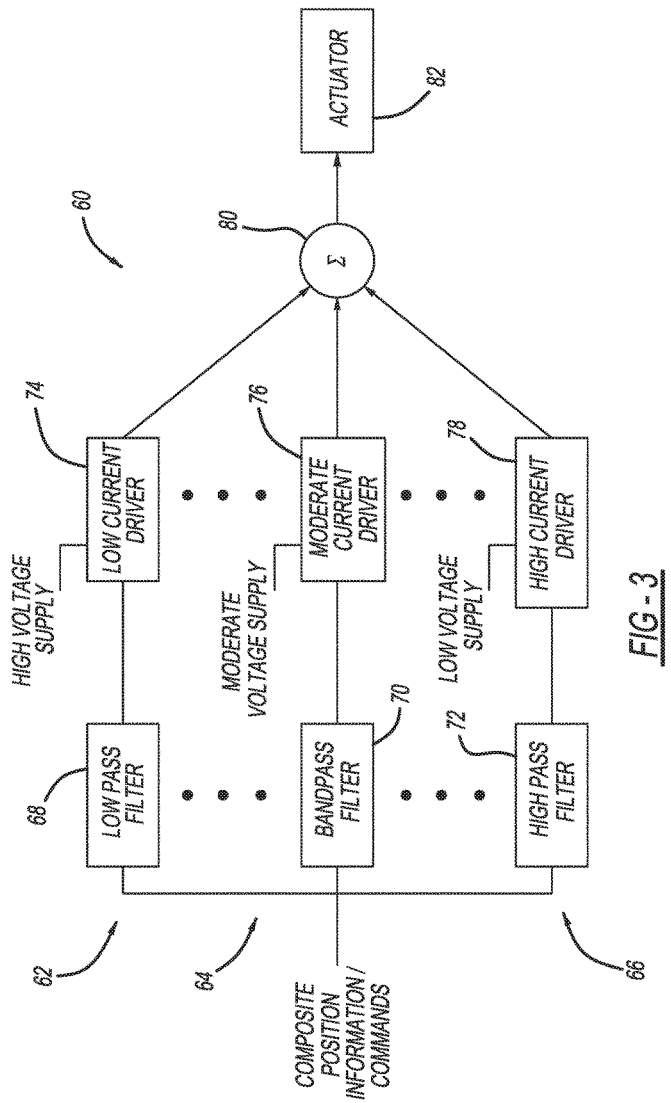
FIG. 3 is a schematic block diagram of a drive system including multiple power paths.

The following discussion of the embodiments of the invention directed to a drive circuit including multiple driver power paths for driving a nutator or tracking device actuator is merely exemplary in nature, and is in no way intended to limit the invention or its applications or uses.

FIG. 1 is a schematic block diagram of a receiver system 10 including a nutator sub-system 12, a beam tracking sub-system 14, a receiver 16 including sensor optics, and a feedback control law 18. The beam tracking sub-system 14 includes a mirror 22 whose position is controlled by a series of three actuators 24 that are each driven by a separate drive circuit 26. Likewise, the nutator sub-system 12 includes a mirror 28 whose position is controlled by a series of three actuators 30 that are each driven by a separate drive circuit 32. Although the mirrors 22 and 28 are employed in this non-limiting embodiment, other types of optical elements may be applicable in other receiver system designs. The series of actuators 24 or 30 are oriented 120° relative to each other around the mirror 22 or 28, respectively, although fewer or more actuators may be employed in other designs to accomplish motion in one or more axes. Actuators known in the art that are suitable for this purpose include piezoelectric actuators and electrostrictive actuators, including lead magnesium niobate (PMN) electroceramic actuators, well known to those skilled in the art. The actuators 24 and 30 are intrinsically dual electrode devices, however, some design configurations connect one side of all of the actuators 24 or 30 for several axes of actuation to a common ground electrode.

An incoming optical beam 34 that is received by the system 10 impinges on the mirror 22 and is directed therefrom to the mirror 28. The beam 34 is then reflected from the mirror 28 and is received by the sensor optics in the receiver 16 where it is converted to an electrical signal provided on line 36 for further processing in a manner well understood by those skilled in the art. The mirror 28 is oscillated in two-dimensions by the actuators 30 so that when the beam 34 hits the mirror 28 off angle it causes the reflected beam to draw a circle on the sensor optics in the receiver 16, where the mirror 28 is generally oscillated at a high frequency so that high frequency vibrational disturbances on the receiver system 10 can be removed. More specifically, a digital position command signal (near DC) for controlling the nominal directional orientation of the mirror 28 along with an AC sinusoidal signal from an AC source (not shown), for example, a 10 kHz source, superimposed thereon is provided on line 38. The position command signal may be in Cartesian coordinates where the signal would be provided to a transformation circuit (not shown) that transforms the digital Cartesian coordinate signals to three separate axis command signals at 0°, 120° and 240°, where one of the axis command signals is provided for each of the actuators 30. The position signal is generally a slowly moving (near DC) voltage as compared to the AC nutation signal, which can be 10 kHz or greater. The AC signals are properly phased relative to each other so that the drive circuits 32 fire each one of the actuators 30 at a particular point in time to create the oscillating motion of the mirror 28 at the desired rotational speed.

In this manner, the reflected beam from the mirror 28 can be measured to determine whether the receiver 16 is accurately tracking the beam 34. Estimates of the tracking error from the receiver 16 are sent to the feedback control law 18 that generates a broadband waveform signal to control the drive circuits 26 to cause the actuators 24 to adjust the pointing direction of the tracking sub-system 14 thereby accomplishing optimal receiver pointing. The rapidity of the availability of the tracking error estimates as set by the speed of oscillation of the mirror 28, and the maximum bandwidth of the driver circuits 26 both determine the maximum gain and bandwidth setting of the control law 18 and the overall achievable bandwidth of the tracking sub-system 14. The bandwidth of the tracking sub-system 14 then determines the maximum rate of motion of the incoming beam 34 that can be tracked and the maximum frequency of environmental vibration imposed on the receiver system 10 that can be suppressed.

FIG. 2 is a schematic diagram of a known drive circuit 40 that can be employed as one of the drive circuits 26 or 32 in the nutator sub-system 12 or the tracking sub-system 14, where an actuator 42, representing one of the actuators 24 or 30, is shown coupled thereto. The drive circuit 40 includes a digital-to-analog converter (DAC) 44 that receives a data signal on line 46 that, in the case of a nutator sub-system 12 is a combination of the DC or near DC position signal and one of the sinusoidal oscillation signals superimposed thereon, or, in the case of the tracking sub-system 14, is a broadband waveform that is contiguous from DC to some maximum bandwidth. The DAC 44 converts the signal to an analog signal for driving the actuator 42. The analog signal is sent to a negative terminal of an operational amplifier 48 or driver along with a feedback signal on line 50 from an output of the amplifier 48. The amplifier 48 also receives a high voltage supply, here 100 V, on line 52 to support amplification of the analog signal to a suitable level for the actuator 42.

Piezoelectric and electrostrictive actuators are largely capacitive in nature and their motion is generally proportional to the applied voltage, and thus, higher oscillation frequencies require proportionally larger currents to achieve the desired motion. The nominal actuator voltage range for an electrostrictive actuator is unipolar and in the range of 30-100 V and the AC oscillation range is about 5-10 V within that nominal range for a typical nutator device. If a single drive circuit is employed to drive each actuator 24 or 30, it draws all of the current from a power supply that may be as high as, for example, 100 V, which provides all the current times all of the voltage, which is a high power factor for this type of circuit. Further, the faster that the actuators 24 or 30 drive the mirrors 22 and 28 to obtain the desired frequency to eliminate vibrational disturbances, the greater the current draw is required, due to the capacitive nature of the actuator, which further increases the necessary power. A piezoelectric actuator may operate with bipolar voltages and the driver circuit 40 would include a negative supply to accommodate this.

Tracking of an optical beam must counteract platform vibration motion, which is large at low frequencies, but small at high frequencies. Nutation requires small motion at a single high frequency combined with a large nominal (near DC) voltage for nominal position. A single power path would require the maximum amount of voltage to produce the maximum required motion simultaneously with the maximum amount of required bandwidth, which is related to the amount of current required to charge and discharge the load capacitance, and therefore power, which is current times voltage, is maximized. If, instead, a plurality of paths are constructed where each path accommodates a portion of the required spectrum at a corresponding compliance range the power of each path is modest and a total of all of the paths is less than the maximum power consumed by a single driver design with a single path.

Thus, as will be discussed in detail below, the present invention proposes a drive circuit for a nutator or tracking device that employs two or more sub-circuit paths that operate at different supply voltages so as to reduce the power consumption of the drive circuit, where one path provides the large directional motion that is only required at low speeds. For the example discussed above, the power consumption improvement is about 10 to 1. As will be discussed, in one embodiment the nutator or tracking device includes a high frequency drive circuit and a low frequency drive circuit that drives both sides of the actuators 24 or 30 to reduce the required power. The high voltage supply drive circuit has a low bandwidth and a low current output for the position signal and the low voltage supply drive circuit has a high bandwidth and high current output for AC nutation or tracking.

FIG. 3 is a schematic block diagram of a drive system 60 generally illustrating the concept of providing multiple power paths in a nutator, tracker or other such device, as discussed above. In this illustration, the drive system 60 includes three separate power paths including a high power path 62 required for large motion at low frequencies, a moderate power path 64 required for moderate motion at middle frequencies, and a low power path 66 required for small motion at high frequencies. Although three separate power paths are shown in the drive system 60, it is noted that this illustration is intended to depict that any suitable number of multiple power paths can be employed for a particular application.

The composite command signal that may include a near DC position signal and an AC sinusoidal oscillation, or a wideband tracking signal, is provided to a low pass filter 68 in the path 62 that only passes low frequency signals, a bandpass filter 70 in the path 64 that only passes middle frequency signals, and a high pass filter 72 in the path 66 that only passes high frequency signals. The filtered signal in the path 62 is provided to a low current drive circuit 74 along with a high voltage supply signal, the filtered signal in the path 64 is provided to a moderate current drive circuit 76 along with a moderate voltage signal, and the filtered signal in the path 66 is provided to a high current drive circuit 78 along with a low voltage supply signal. The drive circuits 74, 76 and 78 can be any of the drive circuits discussed herein, such as the drive circuit 40, or can be any other suitable drive circuit. Therefore, the frequency of the AC signal in the combined signal determines which of the several power paths will act on that signal, and thus only that amount of voltage is used by the drive system 60. The drive circuit command signals are added in a summation device 80 to drive an actuator 82. It is noted that the signal provided to each of the power paths 62, 64 and 66 does not need to include a nutation signal, but is general to a relatively broad spectrum of frequency signals that may be applied to the actuator 82 for a wide range of desired motion types having the general characteristic of lesser motion amplitude at higher frequencies and vice versa.

Figure 4:
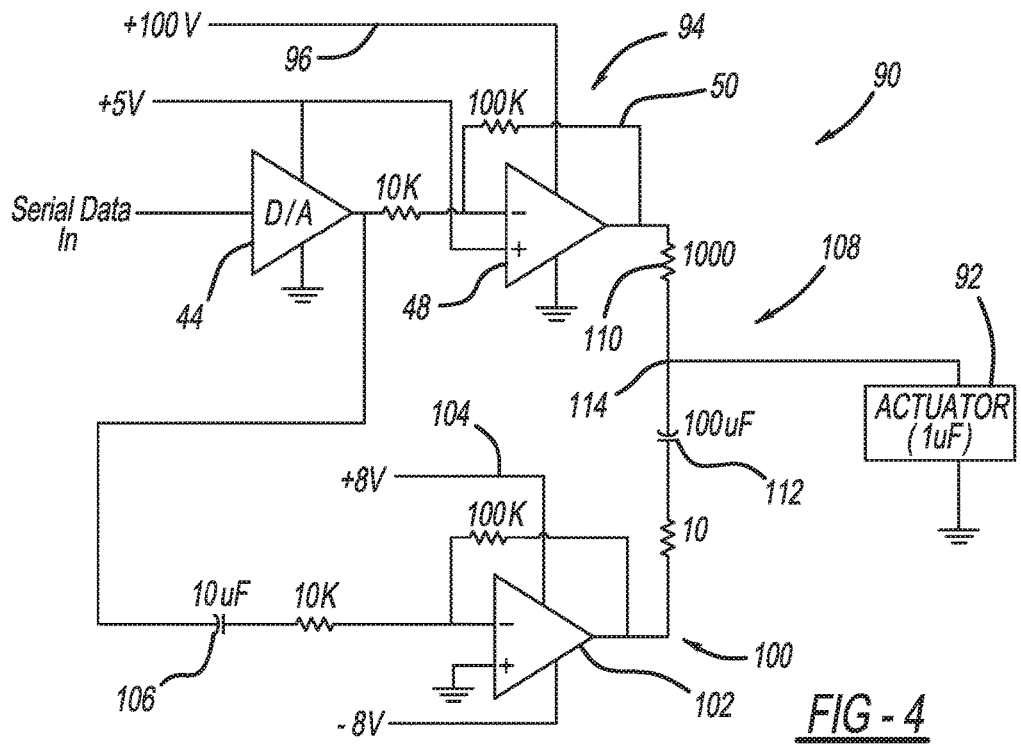
FIG. 4 is a schematic diagram of a wideband drive circuit for driving a single electrode actuator.

FIG. 4 is a schematic diagram of a wideband drive circuit 90 applicable to drive a single electrode actuator 92, where like elements to the drive circuit 40 are identified by the same reference number. The actuator 92 is referred to herein as a single electrode actuator because it can only be driven at one of its terminals because its ground connection is coupled to the ground connections of the other actuators (not shown) in the system. The drive circuit 90 includes a low current, low frequency drive sub-circuit 94 that includes the DAC 44 and the amplifier 48, where the amplifier 48 receives a high voltage supply on line 96, here 100 volts. The drive circuit 90 also includes a high current, high frequency drive sub-circuit 100 that includes an amplifier 102 or driver that also receives the analog signal from the DAC 44 provided through a capacitor 106 at its negative terminal and receives a low voltage supply on line 104, here 8 volts. It is noted that providing two power paths is by way of a non-limiting example, where as discussed above any applicable number of supply voltage paths may be provided. The other input terminals to the amplifiers 48 and 102 have different comparison voltages depending on the DC bias conditions required by the DAC output voltage range in the case of the amplifier 48 and the AC coupled signal in the case of the amplifier 102.

The outputs from the amplifiers 48 and 102 are provided to a combined summation and complementary low pass and high pass filter 108 including a resistor 110, a capacitor 112 and a summation junction 114, where the actuator 92 is coupled to the junction 114 between the resistor 110 and the capacitor 112. It is noted that in this illustration the filter 108 is provided after the driver, whereas in FIG. 3 the filter is provided before the driver. The values of the capacitors 106 and 112 and the resistor 110 determine whether the signal from the low frequency drive sub-circuit 94 or the signal from the high frequency drive sub-circuit 100 will provide drive to the actuator 92. At low frequencies the capacitors 106 and 112 act as open circuits so that the signal from the drive sub-circuit 100 does not drive the actuator 92. As the frequency of the signal increases, the capacitors 106 and 112 act more like short circuits, which allows the drive sub-circuit 100 to drive the actuator 92. The values of the capacitor 112 and the resistor 110 set the frequency value where the current flow will switch between the drive sub-circuits 94 and 100, where the crossover is relatively seamless such that the net amplitude and phase transfer function from the wideband signal at the DAC 44 to the signal imparted to the actuator 92 is free from gaps.

The transfer function from the first drive sub-circuit 94 to the actuator load is a voltage divider that is the parallel combination impedance of the actuator capacitance and the capacitor 112, which is approximately equal to the capacitor 112 divided by the sum of the resistor 110 and the impedance of the parallel combination of the actuator capacitance and the capacitor 112. This is a single pole low pass filter with a corner frequency set by the resistor 110 and the impedance of capacitor 112. The second driver sub-circuit 100 transfer function is a voltage divider that is the resistor 110 divided by the sum of the resistor 110 and the impedance of capacitor 112 (with a small influence from the actuator capacitance). This is a single zero high pass filter with a corner frequency set by the resistor 110 and capacitor 112, which is the same as the low pass filter, and thus the crossover between the sub-circuits 94 and 100 is relatively seamless. The drive circuit 90 provides only unipolar, positive voltages from the sub-circuit 94, but could be readily modified by inclusion of a negative supply voltage, to provide bipolar voltages if required by a certain application.

The summation of two paths can sometimes be more easily accomplished in a mechanism with individual access to both electrodes of the individual constituent piezoelectric or electrostrictive actuators. Summation can be performed by driving one electrode with one path output and the other electrode with the other path output with the appropriate signs.

Figure 5:
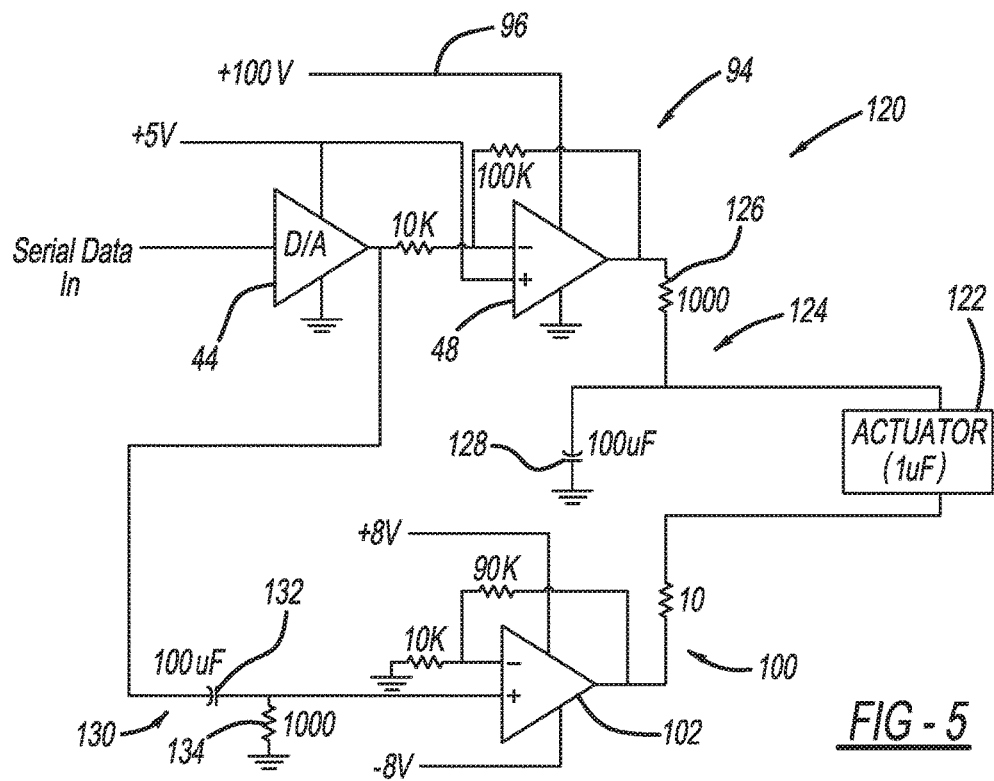
FIG. 5 is a schematic diagram of a wideband drive circuit for driving a dual electrode actuator.

FIG. 5 is a schematic diagram of a wideband drive circuit 120 similar to the drive circuit 90, where like elements are identified by the same reference numeral. In this design, the actuator 92 is replaced with an actuator 122 that includes two electrodes that are available to drive the actuator 122. In other words, the ground terminal of the actuator 122 is not electrically coupled to any of the other actuators that may be present in the system. In this embodiment, the complementary low pass and high pass filter 108 is replaced with a complementary low pass filter 124 including a resistor 126 and a capacitor 128 having the values as shown. Further, the capacitor 106 in the high current, high frequency drive sub-circuit 100 is replaced with a complementary high pass filter 130 having a capacitor 132 and a resistor 134 with the values as shown. The signal from the high current, high frequency drive sub-circuit 100 drives one electrode of the actuator 122 and the signal from the low current, low frequency drive sub-circuit 94 drives the other electrode of the actuator 122. The values of the components in the filters 124 and 130 are the same so that the crossover frequency from one of the drivers to the other driver is seamless.

It will be apparent to those skilled in the art that the complementary low pass and high pass filters discussed above may be constructed at different frequencies and at different locations in the circuit according to the specifics of the system. In some cases, the complementary low pass, high pass and bandpass filters need not be implemented in analog components, but may instead be constructed in digital signal processing elements to operate on the composite signal before conversion to analog signals that drive the corresponding low current, high current and moderate current drivers.

Figure 6:
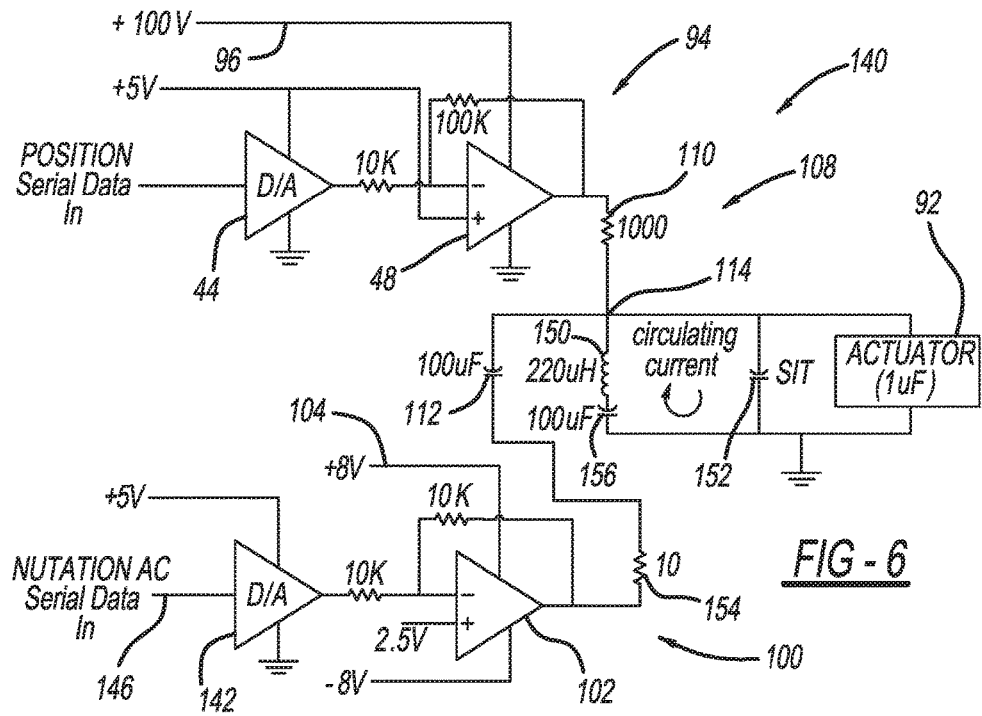
FIG. 6 is a schematic diagram of a nutator drive circuit for driving a single electrode actuator.

FIG. 6 is a schematic diagram of a nutator drive circuit 140 similar to the drive circuit 90 including the single electrode actuator 92, where like elements are identified by the same reference number. The drive circuits 90 and 100 each employ two power paths, but only one input signal that comprises the composite position and oscillation signal. In the drive circuit 140, the position signal and the AC oscillation signal are provided as separate inputs to the different power paths. Particularly, the low current, low frequency drive sub-circuit 94 receives the DC or low frequency position signal at the input of the DAC 44 and the digital nutator AC oscillation signal is provided to a DAC 142 on line 146 in a high current, high frequency drive sub-circuit 100. The low current, low frequency drive sub-circuit 94 operates at high voltage as required for steering the mirror 28 in a particular direction, where the nominal orientation of the mirror 28 does not need to change very rapidly over time, which requires less current. For those times when the actuator 92 needs to be driven at a high nutation frequency, such as 10 kHz, then the high current, high frequency drive sub-circuit 100 that operates at the reduced supply voltage of 8 volts is used to drive the actuator 92, so that a reduced amount of power is consumed.

A nutation device typically operates at a single frequency per actuator axis, and therefore, electrical resonance can be used to store energy when the actuator load is being discharged and recycled when the actuator load is being charged.

A resonating coil 150 having a 220 µH value in this example and a select-in-test (SIT) capacitor 152 are coupled to the combined summation and complementary low pass and high pass filter 108 in parallel with the actuator 92. The actuator 92 has a relatively high capacitance, in this example 1 µF, and thus a significant charge is discharged from the actuator 92 when the other actuators in the system are firing. This charge creates a changing and circulating current flow through the coil 150, and through inductance, stores magnetic energy that can be used to help charge the actuator 92 when it is later being driven by the signal from the drive sub-circuit 100. The SIT capacitor 152 can be used to compensate for actuator and inductor tolerances to cause the resonance of the circuit to match the desired frequency of nutation. Applications which require a Lissajous pattern of nutation, in which different mechanism axes are driven with different frequencies, are easily accommodated by the subject invention by providing resonant circuits tuned to the appropriate frequency for the actuator or actuators associated with each axis. In this embodiment, a 100 µF capacitor 156 is provided in series with the coil 150 to block the high voltage coming from the first drive circuit 94, which would otherwise generate an unwanted large DC current in the coil 150. A resistor 154 sets the current that is available from the drive sub-circuit 100 and capacitor 112 couples the drive to the resonant circuit while blocking DC current.

Figure 7:
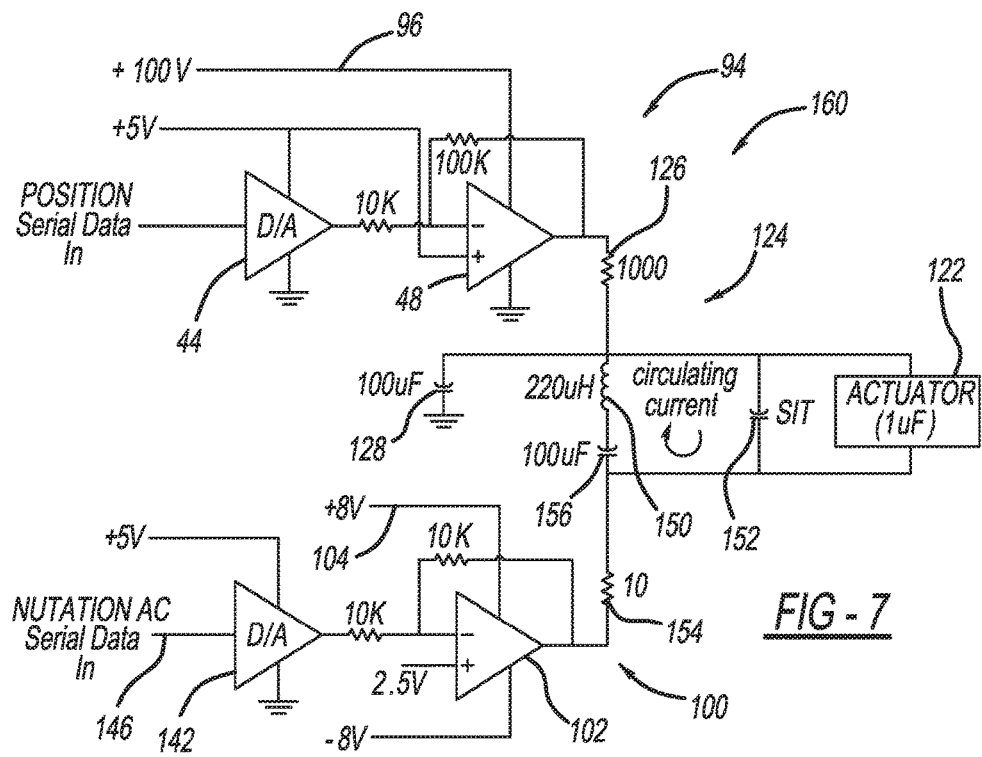
FIG. 7 is a schematic diagram of a nutator drive circuit for driving a dual electrode actuator.

FIG. 7 is a schematic diagram of a nutator drive circuit 160, where like elements to the drive circuits 120 and 140 are identified by the same reference number, to show the nutator design that uses the dual electrode actuator 122.

The position and AC nutation signals supplied by separate sources in the examples discussed above for the nutator drive circuits 140 and 160 can instead be supplied by a composite signal that is then decomposed by filtering into the low frequency (near DC) pointing signal and the high frequency AC nutation signal for the two driver circuit paths. The low frequency path of the example embodiments for the nutator drive circuits 140 and 160 can be extended well beyond DC, and even, as appropriate, expanded to more than one path in the manner of FIG. 3 to allow some systems to perform simultaneous nutation and tracking with a single mechanism.

In the case of the nutator drive circuits 140 and 160, the degree to which the position of the nutator in time is predictable is an important performance parameter that influences the accuracy of misalignment estimation and therefore the overall accuracy of the tracking system. This principle is well known even in RF antenna conscan tracking systems that typically operate at much lower rotation rates with correspondingly better predictability. While those skilled in the art will be aware of actuators that employ additional elements and functions to produce high speed measurements of the nutator position it will be apparent that a nutation device with inherent predictability is advantageous. The position of the nutator is directly proportional to the amplitude and phase angle of the voltage impressed on the actuator by the circuits 140 and 160. The degree of predictability of the voltage in the presence of resonant inductor and actuator load capacitor variations is dependent on the amount of current available from the driver, set by the resistor 154, and therefore, will present an accuracy verses power consumption tradeoff. However, typical accuracy requirements will allow a compromise that offers substantial power savings over a non-resonant approach. Further, the SIT capacitor 152 can be implemented with a variable capacitor, for example, a plurality of capacitors and electronically operable switches, to allow periodic adjustment of the circuit resonance to compensate for actuator or inductor variations, thereby maintaining a match with the desired resonance frequency and achieving reduction in required current from the driver for a given accuracy requirement. Applications which require very accurate amplitude may employ an automatic gain control circuit that senses the amplitude appearing at the resonant circuit and adjusts the drive signal accordingly.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A drive system responsive to a drive signal for operating an actuator, said drive system comprising:
a first drive circuit including a first driver and a low pass filter for passing low frequency signals, said first drive circuit operating with a first voltage supply; and
a second drive circuit including a second driver and a high pass filter for passing high frequency signals, said second drive circuit operating with a second voltage supply that is less than the first voltage supply, wherein the drive signal is provided to the actuator from the first drive circuit when the frequency of the drive signal is below a predetermined value and the drive signal is provided to the actuator from the second drive circuit when the frequency of the drive signal is above the predetermined value.

2. The drive system according to claim 1 wherein the low pass filter and the high pass filter are combined as a complementary low pass and high pass filter.

3. The drive system according to claim 2 wherein the complementary low pass and high pass filter is provided between the first and second drivers and the actuator.

4. The drive system according to claim 2 wherein the actuator is a single electrode actuator where the drive signal is provided to the single electrode from both the first and second drive circuits.

5. The drive system according to claim 1 wherein the low pass filter is provided between the first driver and the actuator and the high pass filter is provided before the second driver.

6. The drive system according to claim 5 wherein the actuator is a dual electrode actuator where the drive signal is provided to a first electrode from the first drive circuit and a second electrode from the second drive circuit.

7. The drive system according to claim 1 wherein the drive signal is a digital signal, said drive system further comprising at least one digital-to-analog converter (DAC) for converting the digital signal to an analog signal to be amplified by the first and second drivers.

8. The drive system according to claim 1 wherein the drive system is part of a nutator for positioning and oscillating an optical element, said drive signal including a low frequency component for causing the actuator to position the optical element and a high frequency AC component for causing the actuator to oscillate the optical element.

9. The drive system according to claim 8 wherein the low pass filter filters out the AC component to allow the first drive circuit to position the optical element using the first voltage supply at high voltage and low current and the high pass filter filters out the low frequency component to allow the second drive circuit to oscillate the optical element using the second voltage supply at low voltage and high current.

10. The drive system according to claim 8 further comprising a resonating coil electrically coupled in parallel with the actuator and being operable to provide additional energy to drive the actuator when the actuator is being driven by the second drive circuit.

11. The drive system according to claim 1 wherein the drive system is part of a tracking device for positioning an optical element, said drive signal including a broadband waveform signal to position the optical element.

12. The drive system according to claim 11 wherein the low pass filter rejects a high frequency portion of the broadband signal to position the optical element using the first voltage supply at high voltage and low current and the high pass filter rejects a low frequency portion of the broadband signal to allow the second drive circuit to position the optical element using the second voltage supply at low voltage and high current.

13. The drive system according to claim 1 further comprising a third drive circuit including a third driver and a band pass filter for passing medium frequency signals, said third drive circuit operating with a third voltage supply that is between the first and second voltage supplies.

14. The drive system according to claim 1 wherein the actuator is a piezoelectric or electrostrictive actuator.

15. A drive system responsive to a drive signal for operating an actuator, said actuator being one of a plurality of actuators that position and oscillate an optical element for nutation purposes, said drive system comprising:
a low current, low frequency drive circuit including a first digital-to-analog converter (DAC), a first driver and a low pass filter for passing low frequency signals, said first DAC receiving a low frequency position signal and converting it to an analog position signal, said first driver receiving the analog position signal and a high voltage supply signal to provide a low current, low frequency drive signal for the actuator; and
a high current, high frequency drive circuit including a second DAC, a second driver and a high pass filter for passing high frequency signals, said second DAC receiving a digital AC oscillation signal and converting it to an analog AC oscillation signal, said second driver receiving the analog AC oscillation signal and a low voltage supply signal to provide a high current, high frequency drive signal for the actuator, wherein the low pass filter and the high pass filter are operable to allow only one of the low current, low frequency drive signal or the high current, high frequency drive signal to be passed to the actuator.

16. The drive system according to claim 15 further comprising a resonating coil electrically coupled in parallel with the actuator and being operable to recycle energy to drive the actuator when the actuator is being driven by the high current, high frequency drive circuit.

17. The drive system according to claim 15 wherein the low pass filter and the high pass filter are combined as a complementary low pass and high pass filter.

18. The drive system according to claim 17 wherein the complementary low pass and high pass filter is provided between the first and second drivers and the actuator.

19. The drive system according to claim 18 wherein the actuator is a single electrode actuator where the analog position signal and the AC oscillation signal are provided to the single electrode.

20. The drive system according to claim 15 wherein the low pass filter is provided between the first driver and the actuator and the high pass filter is provided before the second driver.

21. The drive system according to claim 20 wherein the actuator is a dual electrode actuator where the drive signal is provided to a first electrode from the low current, low frequency drive circuit and a second electrode from the high current, high frequency drive circuit.

22. A drive system responsive to a digital broadband drive signal for operating an actuator, said actuator being one of a plurality of actuators that position an optical element for beam tracking purposes, said drive system comprising:
a first drive circuit including a digital-to-analog converter (DAC), a first driver and a low pass filter for passing low frequency signals, said DAC receiving the broadband drive signal and converting it to an analog drive signal, said first drive circuit operating with a first voltage supply; and a second drive circuit including a second driver and a high pass filter for passing high frequency signals, said second drive circuit receiving the analog drive signal and operating with a second voltage supply that is less than the first voltage supply, wherein the analog drive signal is provided to the actuator from the first drive circuit when the frequency of the drive signal is below a predetermined value and the drive signal is provided to the actuator from the second drive circuit when the frequency of the drive signal is above the predetermined value.

23. The drive system according to claim 22 wherein the low pass filter and the high pass filter are combined as a complementary low pass and high pass filter.

24. The drive system according to claim 23 wherein the complementary low pass and high pass filter is provided between the first and second drivers and the actuator.

25. The drive system according to claim 23 wherein the actuator is a single electrode actuator where the drive signal is provided to the single electrode from both the first and second drive circuits.

26. The drive system according to claim 22 wherein the low pass filter is provided between the first driver and the actuator and the high pass filter is provided before the second driver.

27. The drive system according to claim 26 wherein the actuator is a dual electrode actuator where the drive signal is provided to a first electrode from the first drive circuit and a second electrode from the second drive circuit.

* * * * *